United States Patent [19]
Elisofon et al.

[11] 3,784,990
[45] Jan. 15, 1974

[54] CHILD'S BED SUPPORT FOR MOTOR VEHICLES

[76] Inventors: Barry A. Elisofon; Judith Elisofon, both of 2010 Newkirk Ave., Brooklyn, N.Y. 11226

[22] Filed: May 11, 1972

[21] Appl. No.: 252,281

[52] U.S. Cl............................. 5/94, 5/118, 108/44
[51] Int. Cl........................ A47c 27/08, A47d 7/00
[58] Field of Search ...................... 5/93, 94, 98, 99, 5/118, 114; 108/43, 44, 112

[56] References Cited
UNITED STATES PATENTS

| | | | |
|---|---|---|---|
| 2,645,789 | 7/1953 | Wisner, Jr. | 5/94 |
| 3,208,407 | 9/1965 | Maskew | 5/94 X |
| 3,574,872 | 4/1971 | Mattila | 5/94 |

Primary Examiner—Casmir A. Nunberg
Attorney—George Gottlieb et al.

[57] ABSTRACT

A stand for supporting a baby's bed within a motor vehicle which consists of two individual, interengageable, foldable units. Each unit consists of a telescoping rod capable of being braced against opposed surfaces of a car interior. Each rod is adapted to be rested on the seat of the vehicle and has a foldable leg erectable to support it on the floor of the vehicle. Each rod also has a foldable spacing member capable of being moved into normal relation thereto and having at its free end means for engaging the rod of the other unit, to thereby both space and connect the units into a platform; the two spacing rods being connected to their rods in relatively different positions, intermediate the ends of the rod.

8 Claims, 3 Drawing Figures

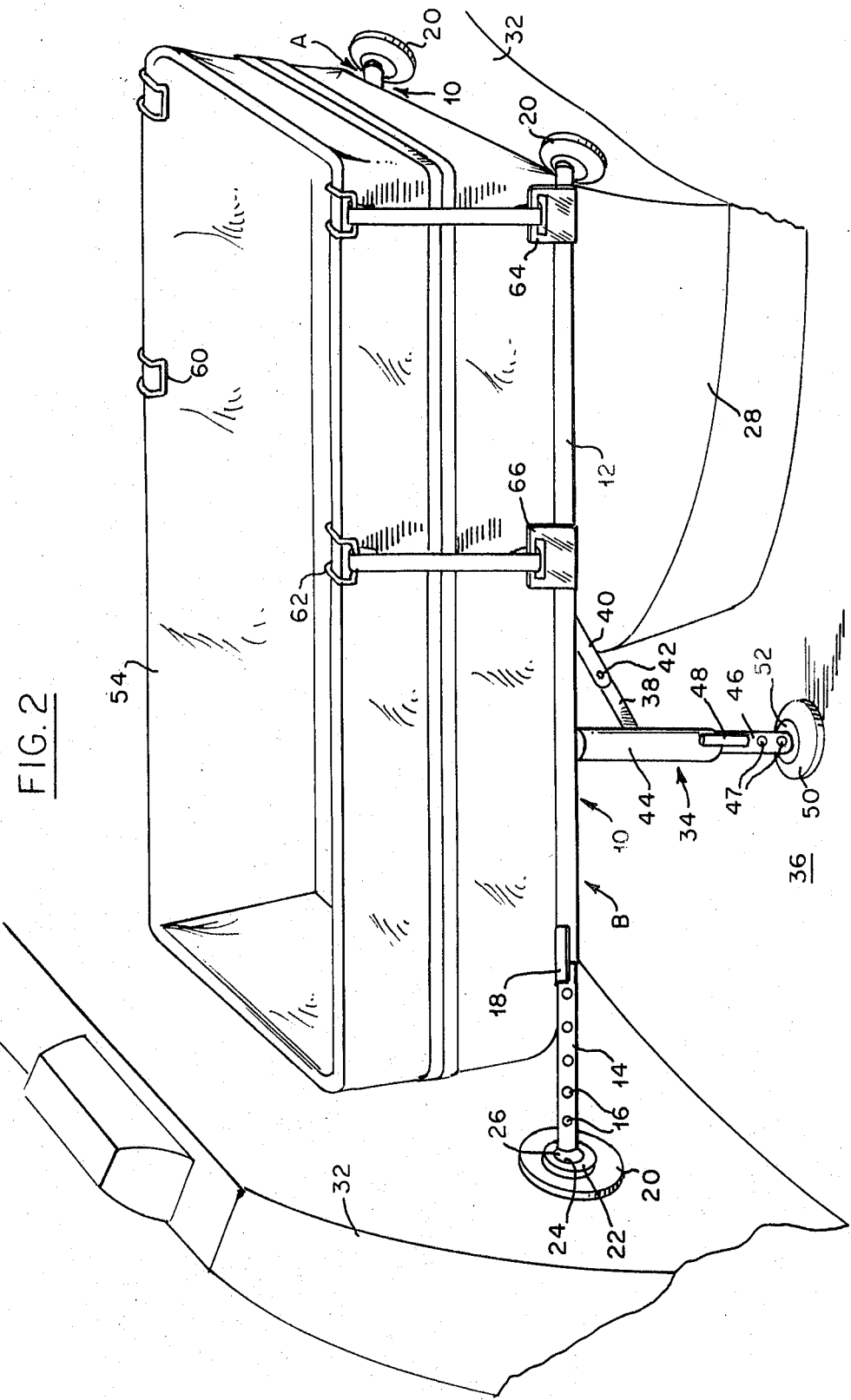

CHILD'S BED SUPPORT FOR MOTOR VEHICLES

The present invention relates to a platform for supporting an infant's bed in a motor vehicle such as the conventional passenger automobile and, more particularly, for supporting an infant's bed of the type that is detachable from a baby carriage.

Many infants or baby carriages or strollers are formed with a detachably suspended infant-receiving bed which generally includes a fabric or cloth bed held within a rigid metal frame; and the present invention is directed to the provision of a platform to be mounted within the vehicle on which such detachable bed is supported and secured.

Various devices have heretofore been proposed to be used for supporting a detachable infant's carriage bed in a motor vehicle. Generally such devices were either in the form of appendages or attachments for the frame of the detachable bed which engage over the seat backs of the vehicle, and in general, even with other types, were not firmly fixed and secured within the vehicle and, therefore, were not sufficiently safe for use and exposed the child reposing therein to injury in case of even minor accident or sudden stop. Further, such prior devices were either clumsy and bulky, and, therefore, inconvenient to transport or store when not in use or involved the use of relatively small attachments which, when detachable, were prone to be misplaced or lost.

The present invention is, therefore, directed to a platform for supporting a detachable infant's bed for use in a motor vehicle which may be safely and securely anchored and supported within the vehicle and will safely and securely hold the bed supported thereon.

It is also an object of the present invention to provide a platform, of the character described, which is braced against a plurality of points within the vehicle, including the vehicle seat, to be thereby substantially immobilized and held in place in fixed position within the vehicle.

It is another object of the present invention to provide a platform for the support of a detachable infant's bed, within the vehicle of the character described, which is compactly foldable and will occupy a minimum of space for easy and convenient storage for transportation when not in use.

It is still another object of the present invention to provide a platform of the character described which may be quickly and easily set up within the vehicle and have the bed quickly and easily mounted and secured thereon.

It is yet another object of the present invention to provide a platform for the support of an infant's detachable bed within a vehicle, of the character described, on which beds of varying sizes may be secured.

It is a further object of the present invention to provide a platform for supporting a detachable infant's bed within a vehicle which may be readily and easily adjusted to be set up in vehicles of various types and sizes.

It is a still further object of the present invention to provide a platform for the support of a detachable infant's bed, of the cahracter described, which may be positioned within the vehicle and on which the infant's bed may be secured, in various arrangements, as longitudinally and transversely of the vehicle.

The foregoing and other objects and advantages of the supporting platform for a detachable infant's bed for use in a vehicle will become more readily apparent to those skilled in the art from the embodiment thereof shown in the accompanying drawing and from the description following. It is to be understood, however, that such embodiment is shown by way of illustration only, to make the principles and practice of the invention more readily comprehensible and without any intent of limiting the invention to the specific details therein shown.

In the Drawing:

FIG. 2 is a similar view of the vehicle interior, viewed from the other side thereof, and showing a detachable infant's bed mounted and secured on the platform.

Generally stated, the present invention consists in the formation of a bed supporting platform for vehicles formed of two separate and individual sections, each of which is foldable into an individual, ellongated, compactly folded body and each of which may be individually set up and secured in place within the vehicle and releasable inter-engaged with the other to provide a firm platform for the infant's bed; each member having means for securing one side of the carriage on the platform.

More specifically stated, the platform of the invention consists of two separate, individual, substantially identical units designated as A and B. Each unit comprises a telescoping rod, generally designated at 10, adapted to form a side of the platform, formed of an outer tube, 12, and an inner tube, 14, telescoping within the outer tube 12; the two tubes having cooperating means for firmly securing them in adjusted telescoped position. Such securing means may be of any conventional type used for similar purposes, as the longitudinally spaced appertures, 16, formed on the inner tube, 14, and the aperture engaging element, 18, provided on the telescoping end of tube 12.

Figure 1:
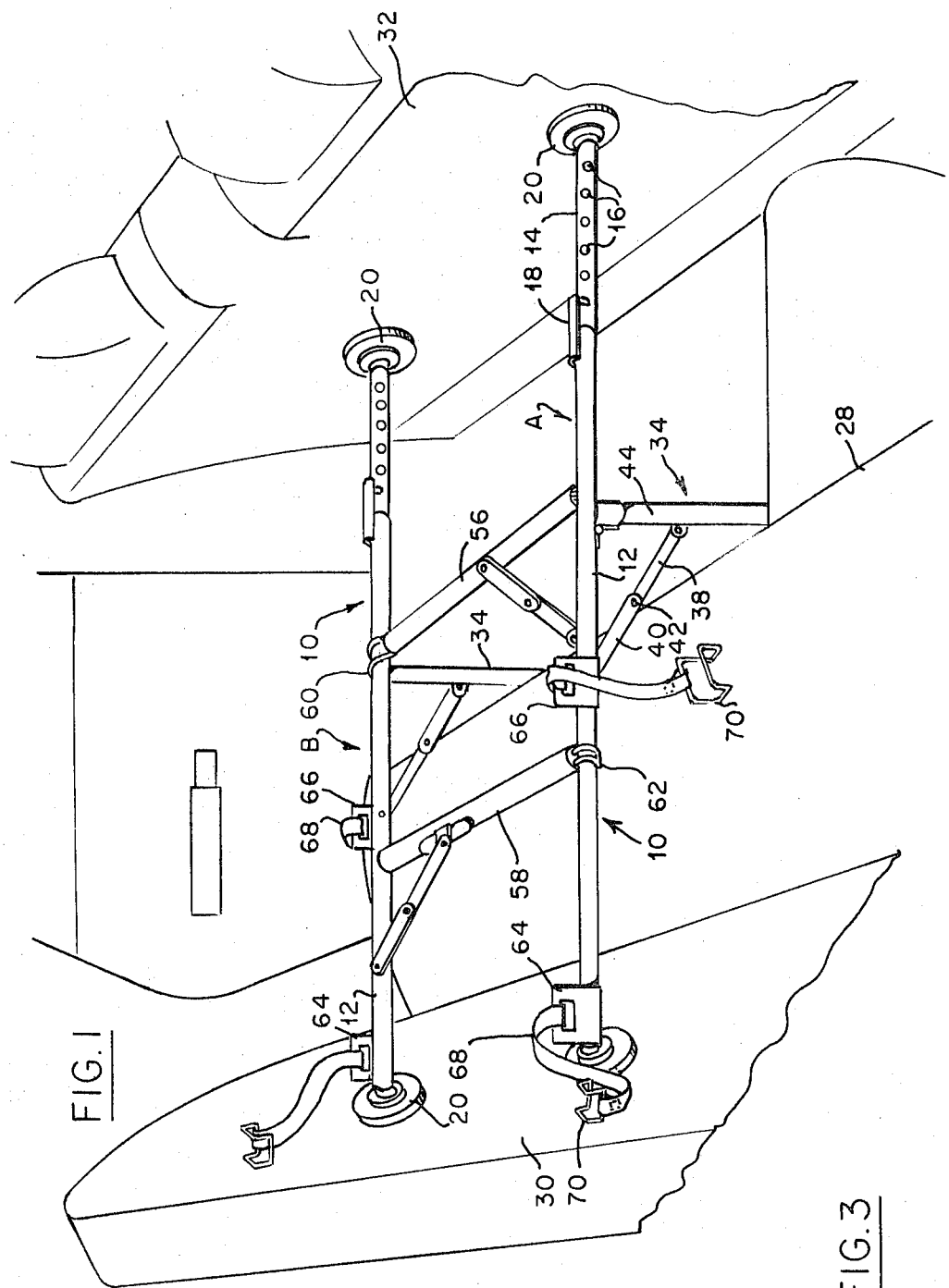
FIG. 1 is a perspective view of the bed supporting platform of the invention, shown as set up within the rear compartment of a passenger motor vehicle, viewed from one side.
Figure 3:
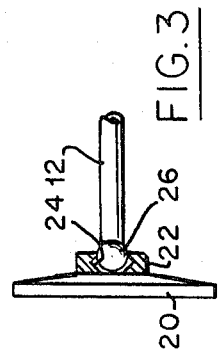
FIG. 3 is a detailed view, partly broken away of one end of a horizontal member of the supporting platform of the invention.

Each of tubes 12 and 14 of each rod 10 is provided in its free end with an enlarged surface-contacting pad-like relatively stiff disc, 20, which is preferably pivotly supported on the end of the tube to be adjustable to the vertical angle of a surface against which it is to be engaged. One form of such pivotal mounting of pad 20 is illustrated in FIG. 3 wherein the pad 20 is provided on its outer face with a stud 22 within which is formed a socket, 24, for a ball, 26, mounted on the end of the tube.

Arms 10 of each of platform sections A and B may be rested, preferably by their tubes 12, on the rear seat 28, of a vehicle and their length adjusted so that one of the pads 20 is braced against the front of the rear seat 30 and the other is braced against the back of the front seat, 32, to thereby be firmed in place. Each disc 20 is preferably of a size or diameter greater than that of the metal springs generally placed in the interior of the backs of the front and rear seats 30 and 32 for giving them resilience, so that they may overlap such springs and thereby avoid the tearing of the fabric overlying such springs.

The outer tube 12 of each rod 10 may be of a length greater than the width of the seat 28 and may be provided at its overlap with a leg, generally designated as 34, which may support and brace rod 10 on the floor, 36, of the vehicle. Each leg 34 may be pivotally supported on tube 12, in any desired manner for folding them against one another, when not in use. In the illustrated embodiment, the pivotal supporting means for the leg comprise links, 38 and 40, which are interhinged by one of their ends, as at 42, and pivoted by their other ends to the tube 12 and the leg 34. To accomodate the legs 34 for use in vehicles with seats 28 of different height they may be telescopically formed; consisting of an outer tube 44 and an inner tube 46 formed with spaced appertures, 47 engageable by the engaging element 48 mounted on the outer tube 44.

It will be understood that leg 34 is so hinged on tube 12 that, when erected, in normal relation to its connected rod 10, its free end will underlie tube 12 and the latter will rest upon it. Tube 46 of leg 34 may be provided at its free end with a caster, 50, which may be pivotly supported thereon, as at, 52, to provide a wide base by which it may be rested on vehicle floor 36 to render the leg more steady as well as to preserve the vehicle floor.

Means are provided on each of platform sections A and B for appropriately spacing them from one another and, at the same time, interconnecting them against displacement relative to one another when they are arranged within the vehicle for supporting a child's bed, 54, thereon. Such means may comprise connecting and spacing rods, 56 and 58, one of which, as 56, is pivotly connected to tube 12 of section A in relatively close proximity to its free end and in a manner to be disposed in folded relation thereagainst, in one position, and in normal relation thereto in a section position. The other rod 58 may be similarly connected to tube 12 of section B, but at a greater distance from its free end.

Spacing rods 56 and 58 may be pivotly connected to their respective tube 12 in any desirable manner, such as by linkage similar to the linkage connecting legs 34 to tubes 12. However, the pivoting means is so arranged that in folding and unfolding the rods 56 and 58 they may move in a plane at right angles to the plane of movement of lege 34 when the latter are folded and unfolded.

Each of rods 56 and 58 is provided at its free end with means for engaging tube 12 of the opposed platform section against lateral displacement of that section relative to the section to which the rod is connected. These means may be in the form of hooks, 60 and 62, connected, respectively, to the free ends of rods 56 and 58 which may fit, as by snapping, over the tube 12.

It will be readily apparent that when platform sections A and B are set up within a vehicle with the telescoping rods 10 resting on the seat thereof and adjusted to be braced against the backs of the front and the rear seats of the vehicle, with their legs supported on the floor of the vehicle, and the spacing rods 56 and 58 each engaged by its hook over tube 12, a firm and steady platform is provided for a child's bed 54.

Means are provided for securing the bed 54 for safely holding it on the platform. Such means are shown to comprise a pair of longitudinally spaced ears, 64 and 66, secured to each of tubes 12, to each of which is secured, by one end, an adjustable band 68, each provided with a hook, 70, at its other end, which is engageable over the top edge of the bed 54. Bands 70 may be manually adjustable in length, in a manner that will be readily understood by those skilled in the art, or may be automatically adjustable, as by being comprised of elastic material, as illustrated. It will be readily seen that when the platform is set up, as described above, and the bed 54 placed upon it and engaged by hooks 70, the bed will be safely and securely held in place.

It may here be stated that while the bed 54 is shown in the drawing as being longitudinally disposed on the platform; the same may be disposed transversely thereof in a manner that will be readily understood and not thought necessary to be separately illustrated.

It may here also be stated that the platform, instead of being supported between the front and back seats of the vehicle, transversely of the rear seat, it may be disposed to rest longitudinally thereon, with legs 34 in folded position and telescopic rods 10 braced against the sides of the vehicle, in a manner that will be readily understood.

It will be readily apparent that a platform of the present invention may be quickly and easily dismantled, when the bed 54 is removed therefrom, by disengaging hooks 70 from tubes 12; shortening telescopic rods 10 to disengage them from the vehicle seats and then folding legs 34 and the connecting rods 56 and 58 against their connected tubes 12, to thereby arrange platform sections A and B in separate compact units that may be easily stored and transported.

This completes the description of the vehicle platform for a child's bed of the present invention, and the manner of its use. It will be readily apparent, however, that numerous variations and modifications therein may be made by anyone skilled in the art, in accordance with the principles of the invention hereinabove set forth and without the exercise of any inventive ingenuity.

We claim:

1. A platform for supporting a child's bed within a vehicle, said vehicle including a rear seat and a front seat, said platform comprising a pair of units, each said unit comprising a rod, means extending said rod to press against the front of said rear seat and the back of said front seat; a leg pivotally supported on said rod for movement into folded position thereagainst and to normal relation thereto for supporting said rod on the floor of the vehicle; and a member pivotally connected to each said rod for folding thereagainst in one position and to normal relation thereto in another position, said member having means at one end engageable over the rod of said outer unit for interengaging said units in spaced relation relative to one another, each said rod having means connected thereto for engaging the child's bed rested on the platform formed by the interconnection of said rods.

2. The platform of claim 1, wherein said rod is formed of a pair of telescoping members and means are provided for interengaging said members in adjusted telescopic position.

3. The platform of claim 2, wherein said telescoping members comprise an inner and an outer tube and said legs and said connecting members are each connected on said outer tube.

4. The platform of claim 2, wherein said leg is arranged to have its upper end underlie said rod when moved into normal position relative thereto.

5. The platform of claim 2, wherein said connecting member is arranged to have an end thereof abut the rod to which it is connected when moved into normal position relative thereto.

6. The platform of claim 2, wherein said legs and said connecting members are arranged for pivotal movement in planes normal to one another.

7. The platform of claim 1, wherein each said rod of each said unit has a disk-like plate pivotally connected thereto by its center at each end thereof.

8. The platform of claim 1, wherein said leg is telescopic and comprises an outer upper tube and an inner lower tube and means are provided for interengaging said inner and outer tube in adjusted telescoped position.

* * * * *